US012168901B1

(12) United States Patent
Sultana et al.

(10) Patent No.: US 12,168,901 B1
(45) **Date of Patent: *Dec. 17, 2024**

(54) PANEL WITH PIVOTING AND TRANSLATIONAL MOTION

(71) Applicant: APPLE INC., Cupertino, CA (US)

(72) Inventors: Trevor M. Sultana, Mountain View, CA (US); Ali Tavakoli Targhi, San Jose, CA (US); Steven H. Klotz, Austin, TX (US); Donald R. Monroe, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,702

(22) Filed: Dec. 19, 2023

Related U.S. Application Data

(63) Continuation of application No. 17/868,830, filed on Jul. 20, 2022, now Pat. No. 11,851,926.

(60) Provisional application No. 63/247,585, filed on Sep. 23, 2021.

(51) Int. Cl.

| | |
|---|---|
| ***E05D 15/10*** | (2006.01) |
| ***E05D 15/16*** | (2006.01) |
| ***E05D 15/56*** | (2006.01) |
| ***E05F 15/695*** | (2015.01) |
| ***E05F 15/697*** | (2015.01) |

(52) U.S. Cl.
CPC ........... *E05D 15/56* (2013.01); *E05D 15/165* (2013.01); *E05F 15/695* (2015.01); *E05F 15/697* (2015.01); *E05Y 2201/406* (2013.01); *E05Y 2201/434* (2013.01); *E05Y 2201/654* (2013.01); *E05Y 2201/668* (2013.01); *E05Y 2201/684* (2013.01); *E05Y 2201/702* (2013.01); *E05Y 2400/45* (2013.01); *E05Y 2800/102* (2013.01); *E05Y 2900/55* (2013.01)

(58) Field of Classification Search
CPC ..... E05D 15/56; E05D 15/165; E05D 15/695; E05D 15/697; E05Y 2201/406; E05Y 2201/434; E05Y 2201/654; E05Y 2201/668; E05Y 2201/684; E05Y 2400/45; E05Y 2800/102; E05Y 2900/55
USPC ........................................................... 49/212
See application file for complete search history.

(56) References Cited

U.S. PATENT DOCUMENTS

| | | | |
|---|---|---|---|
| 1,911,697 | A | 5/1933 | Levan |
| 2,844,405 | A | 7/1958 | Roethel |
| 2,917,792 | A | 12/1959 | Abraham et al. |
| 2,992,039 | A | 7/1961 | Bretzner |
| 3,802,125 | A | 4/1974 | Baker |
| 3,844,064 | A | 10/1974 | Yamaha et al. |
| 4,094,100 | A | 6/1978 | Fukumoto et al. |
| 4,575,967 | A | 3/1986 | Bickerstaff |
| 4,730,414 | A | 3/1988 | Nakamura et al. |

(Continued)

FOREIGN PATENT DOCUMENTS

| | | | |
|---|---|---|---|
| DE | 3037397 | A1 | 4/1982 |
| DE | 3438580 | A1 | 4/1986 |

(Continued)

*Primary Examiner* — Jerry E Redman
(74) *Attorney, Agent, or Firm* — Young Basile Hanlon & MacFarlane, P.C.

(57) ABSTRACT

A panel is supported by a track for movement along the track between a closed position and an open position, and is further supported by a pivot assembly that is configured to pivot the track and the panel.

20 Claims, 8 Drawing Sheets

(56) References Cited

U.S. PATENT DOCUMENTS

| | | | | |
|---|---|---|---|---|
| 4,771,575 | A | 9/1988 | Tiesler | |
| 4,785,582 | A * | 11/1988 | Tokue | E05F 11/525 49/374 |
| 4,788,794 | A | 12/1988 | Miller | |
| 4,819,377 | A | 4/1989 | Bauer et al. | |
| 4,829,711 | A | 5/1989 | Sambor | |
| 4,927,207 | A | 5/1990 | Kishino | |
| 4,956,942 | A | 9/1990 | Lisak et al. | |
| 5,009,461 | A | 4/1991 | Smith-Horn et al. | |
| 5,016,392 | A | 5/1991 | Thomas et al. | |
| 5,038,519 | A * | 8/1991 | Huebner | E05F 11/385 49/352 |
| 5,054,238 | A | 10/1991 | Glossop, Jr. et al. | |
| 5,086,586 | A | 2/1992 | Hlavaty et al. | |
| 5,099,611 | A | 3/1992 | Kracht et al. | |
| 5,142,824 | A | 9/1992 | Le Compagnon et al. | |
| 5,159,781 | A | 11/1992 | Glossop, Jr. et al. | |
| 5,249,392 | A | 10/1993 | Houston et al. | |
| 5,433,031 | A | 7/1995 | Dailey | |
| 5,855,095 | A | 1/1999 | Dedrich et al. | |
| 5,927,021 | A * | 7/1999 | Kowalski | B60J 5/0416 49/502 |
| 5,960,588 | A | 10/1999 | Wurm et al. | |
| 6,029,403 | A | 2/2000 | Bertolini et al. | |
| 6,283,534 | B1 | 9/2001 | Mrozowski et al. | |
| 6,416,144 | B1 | 7/2002 | Houston et al. | |
| 6,425,208 | B1 | 7/2002 | Klueger et al. | |
| 6,560,930 | B2 | 5/2003 | de Gaillard | |
| 6,561,567 | B2 * | 5/2003 | Mrozowski | E05F 15/689 49/501 |
| 6,799,394 | B2 | 10/2004 | Tsung-Lin | |
| 6,952,898 | B2 | 10/2005 | Castellon | |
| 7,121,042 | B2 | 10/2006 | Robert et al. | |
| 7,246,464 | B2 | 7/2007 | Castellon | |
| 7,743,559 | B2 | 6/2010 | Papi et al. | |
| 8,069,610 | B2 | 12/2011 | Graf et al. | |
| 8,127,493 | B2 | 3/2012 | Cappelli et al. | |
| 8,572,898 | B2 | 11/2013 | Grudzinski et al. | |
| 8,646,209 | B2 | 2/2014 | Hampel et al. | |
| 9,254,733 | B2 | 2/2016 | Costigan et al. | |
| 9,932,758 | B2 | 4/2018 | Genta | |
| 10,512,351 | B1 | 12/2019 | Valeriano et al. | |
| 10,730,371 | B2 | 8/2020 | Migaki et al. | |
| 11,085,234 | B2 | 8/2021 | Hunt | |
| 11,225,830 | B2 | 1/2022 | Liu et al. | |
| 11,319,742 | B2 | 5/2022 | Bose et al. | |
| 11,851,926 | B1 * | 12/2023 | Sultana | E05F 15/686 |
| 2003/0009948 | A1 | 1/2003 | Nishikawa et al. | |
| 2003/0150165 | A1 | 8/2003 | Ronay et al. | |
| 2004/0148864 | A1 | 8/2004 | Pax et al. | |
| 2006/0010776 | A1 | 1/2006 | Jutzi | |
| 2006/0283088 | A1 | 12/2006 | Buchta | |
| 2007/0101658 | A1 | 5/2007 | Heyer | |
| 2008/0148647 | A1 | 6/2008 | Pavlovic | |
| 2010/0011668 | A1 | 1/2010 | Broadhead et al. | |
| 2012/0167511 | A1 | 7/2012 | Laudenklos | |
| 2017/0350185 | A1 | 12/2017 | Kuan | |
| 2019/0210432 | A1 | 7/2019 | Frederick et al. | |
| 2019/0323282 | A1 | 10/2019 | Sowinski | |
| 2020/0131842 | A1 | 4/2020 | Thomas et al. | |
| 2020/0247220 | A1 | 8/2020 | Lorentsson et al. | |
| 2021/0206239 | A1 | 7/2021 | Ishiguro et al. | |
| 2022/0032745 | A1 | 2/2022 | Toyota et al. | |

FOREIGN PATENT DOCUMENTS

| | | | |
|---|---|---|---|
| DE | 3740034 | A1 | 6/1989 |
| EP | 0369680 | A2 | 5/1990 |
| EP | 1783310 | A1 | 5/2007 |
| FR | 2339048 | A1 | 8/1977 |
| FR | 2932723 | A1 | 12/2009 |
| JP | S5755615 | U | 4/1982 |
| JP | S58-158935 | U | 10/1983 |
| JP | S59186729 | A | 10/1984 |
| JP | S59-186341 | U | 12/1984 |
| JP | S62-129228 | U | 8/1987 |
| JP | H04-275955 | A | 10/1992 |
| JP | 2001-18655 | A | 1/2001 |
| WO | 2014037448 | A1 | 3/2014 |
| WO | 2022260819 | A1 | 12/2022 |

* cited by examiner

PANEL WITH PIVOTING AND TRANSLATIONAL MOTION

CROSS-REFERENCE TO RELATED APPLICATIONS

This application is a continuation of U.S. application Ser. No. 17/868,830, filed on Jul. 20, 2022, now U.S. Pat. No. 11,851,926, which claims the benefit of U.S. Provisional Application No. 63/247,585, filed on Sep. 23, 2021, the contents of which are hereby incorporated by reference herein in their entireties for all purposes.

TECHNICAL FIELD

This disclosure relates to panels.

BACKGROUND

Some panels can be raised and lowered between a closed position and an open position. As an example, a panel may lower into an interior space.

SUMMARY

A first aspect of the disclosure is a window assembly that is connectable to a vehicle body portion. The window assembly includes a window, a track that supports the window for movement along the track between a closed position and an open position, and a pivot assembly that is configured to pivot the track and the window with respect to the vehicle body portion.

A second aspect of the disclosure is a vehicle that includes a vehicle body portion that defines an interior space, a window that has an inner surface, a window support member that is connected to the inner surface of the window, tracks, a pivot frame, support rods, and drive members. The tracks are located in the interior space of the vehicle body portion and are connected to the window support member so that the window support member is movable along the tracks to move the window between a raised position and a lowered position. The pivot frame is fixed to the vehicle body portion. The support rods are supported by the pivot frame and are connected to the tracks. The drive members are configured to cause extension and retraction of the support rods relative to the pivot assembly frame in response to rotation of the drive members in order to cause pivoting of the tracks and the window with respect to the vehicle body portion.

A third aspect of the disclosure is a vehicle that includes a vehicle body portion that defines an interior space, a window, tracks, a lift actuator, and a pivot actuator. The window is movable between a closed position, in which the window obstructs a window opening, and an open position, in which the window is located in the interior space of the vehicle body portion and does not obstruct the window opening. The tracks support the window. The lift actuator that is configured to move the window relative to the tracks between a closed position and an open position. The pivot actuator is configured to pivot the window between a first angular position, in which the window is in alignment with the window opening, and a second angular position, in which the window is pivoted out of alignment with the window opening.

DETAILED DESCRIPTION

This disclosure is directed to a vehicle that has windows that can be lowered and raised between a closed (e.g., raised) position and an open (e.g., lowered) position. The windows may fully occupy and obstruct a window opening in the closed position. The windows may be partly or fully located inside a vehicle body portion, such as a door, in the open position.

In typical vehicle window designs, windows are typically inset relative to body panels to allow them to translate into a space inside the door or other portion of a vehicle body. Typical vehicle windows translate along a linear path in the case of a flat window, or along a curved path having a curvature that matches the geometry of a curved window.

The windows described herein are supported by a track assembly, and are configured to translate along the track assembly between the closed position and the open position. To allow complex movement of the window during movement between the closed position and the open position, the track assembly can be pivoted by a pivot assembly, which also causes the window to pivot. This complex motion allows an outer surface of the window to be positioned flush relative to surrounding surfaces of the vehicle body when the window is in the closed position.

Figure 1:
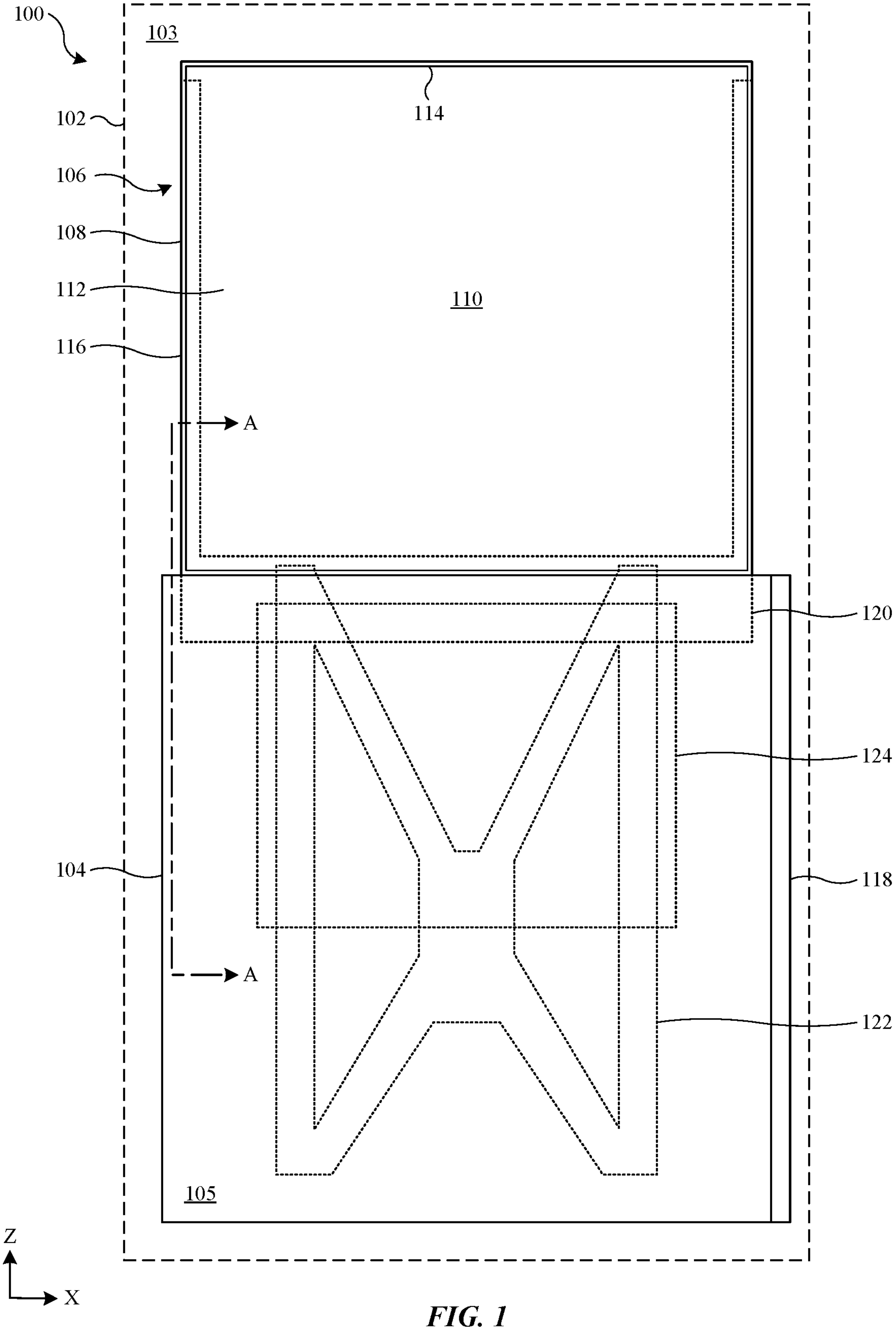
FIG. 1 is a schematic illustration of a portion of a vehicle that includes a vehicle body structure, a door, and a window.

FIG. 1 is an illustration of a portion of a vehicle 100 that includes a vehicle body structure 102, a door 104 (e.g., a vehicle door), and a window 106. The window 106 is depicted in a closed position (or raised position) and is movable to an open (or lowered position). The vehicle 100 may be a road going vehicle, such as a passenger automobile or a cargo vehicle, that includes features that are typically found in conventional examples of such vehicles. The vehicle 100 extends in a longitudinal direction X (e.g., front-to-back), a lateral direction Y (e.g., side-to-side, not shown in FIG. 1), and in an elevational direction Z (e.g., top-to-bottom).

The vehicle body structure 102 and the door 104 are portions of a vehicle body of the vehicle 100. The vehicle body is part of a sprung mass of the vehicle 100, and is supported with respect to a road surface or other surface by conventional structures, such as wheels, tires, and suspension components. The vehicle body structure 102 and the door 104, in cooperation with other portions of the vehicle body, define an exterior, a passenger compartment, and/or a cargo compartment of the vehicle. To preserve clarity, these components are omitted from FIG. 1.

The window 106 is at least translucent in that part of or all of the window 106 is formed from a material, such as glass or plastic, that permits transmission of light through it (e.g., a panel formed from an at least translucent material). As used herein, the term at least translucent includes both translucent and transparent materials. The window 106 has an outer periphery 108 that is adjacent to and aligned with a body surface 103 of the vehicle body structure 102 and/or a door surface 105 of the door 104 when the window 106 is in the closed position. An outer surface 110 of the window 106 may be flush with respect to the body surface 103 and/or the door surface 105 when the window is in the closed position. In the illustrated implementation, the window 106 includes a window panel 112 (e.g., a thin see-through panel formed from at least translucent glass or plastic) and a seal 114 that is formed on the window panel 112 and extends along the outer periphery 108 of the window 106. The seal 114 is formed from a compliant material to seal the window 106 relative to adjacent portions of the vehicle body such as the vehicle body structure 102 and the door 104 in order to resist admission of air and water into the vehicle 100. Thus, in some implementations, the window 106 includes the window panel 112, which is at least translucent, and the seal 114, which is located along a peripheral edge of the window 106 (e.g., along the outer periphery 108 of the window 106), and the seal 114 is in engagement with a vehicle body portion, such as the door 104 and/or the vehicle body structure 102, when the window 106 is in the closed position.

The vehicle body structure 102 defines an opening 116 that is formed through the vehicle body structure 102 to allow access to a passenger compartment or other space inside the vehicle 100. The door 104 is connected to the vehicle body structure 102 in a manner that allows the door 104 to move between a closed position (FIG. 1) and an open position (not shown) using a door hinge 118 or other conventional structure. As an example, the door hinge 118 may allow the door 104 to move between the closed and open positions by sliding or pivoting in any direction. In the illustrated implementation, the window 106 is implemented according to a frameless window design in which the window 106 is connected to and supported by the door 104 but engages the vehicle body structure 102 when closed.

In the illustrated implementation, the opening 116 is a combined door and window opening, but the portions occupied by the door 104 and the window 106 may be referred to herein as a door opening and a window opening, respectively. Alternatively, the door 104 may instead include a window frame portion that extends around the window 106, in which case, window 106 engages the door 104 in the closed position of the window, and the door 104 engages the vehicle body structure 102 in the closed position of the door. In this configuration, separate door openings and window openings are defined by the vehicle body structure 102 and the door 104, respectively.

The window 106 is connected to the door 104 by a window support member 120, a track assembly 122, and a pivot assembly 124. The track assembly 122 is connected to the window 106 by the window support member 120 and supports the window 106 for movement along the track assembly 122 between the closed position and the open position with respect to a vehicle body portion of the vehicle 100, such as the door 104 or the vehicle body structure 102. The pivot assembly 124 is configured to pivot the track assembly 122 and the window 106 with respect to the door 104. Pivoting the window 106 with respect to the door 104 (or other vehicle body portion) allows the outer surface 110 of the window 106 to be flush relative to a vehicle body surface of the vehicle body portion, such as the door surface 105 of the door 104, when the window 106 is in the closed position, while also allowing the window 106 to move between the closed position and the open position.

Figure 2:
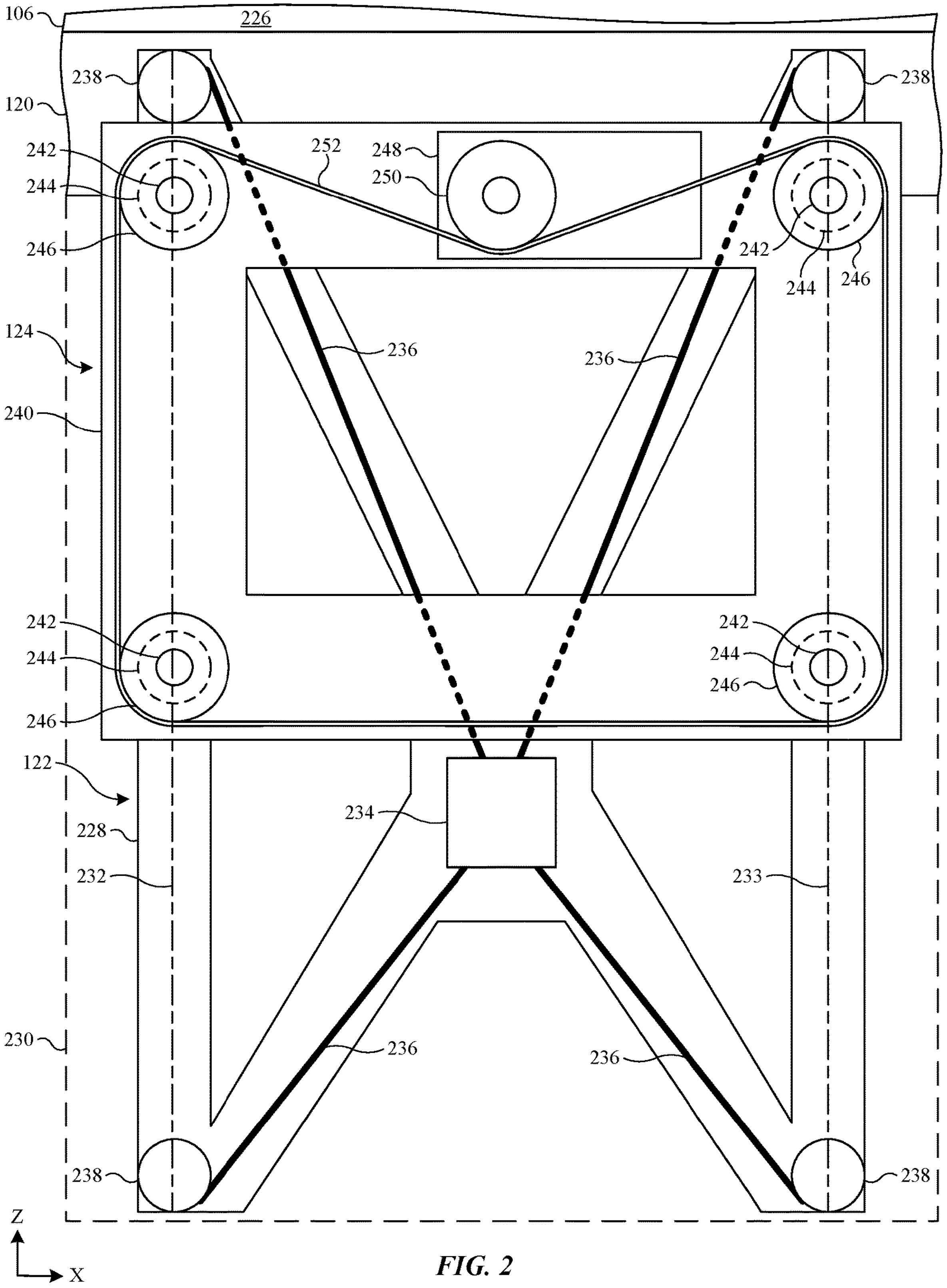
FIG. 2 is a schematic illustration that shows the window, a track assembly, and a pivot assembly, with the window in a closed position.
Figure 3:
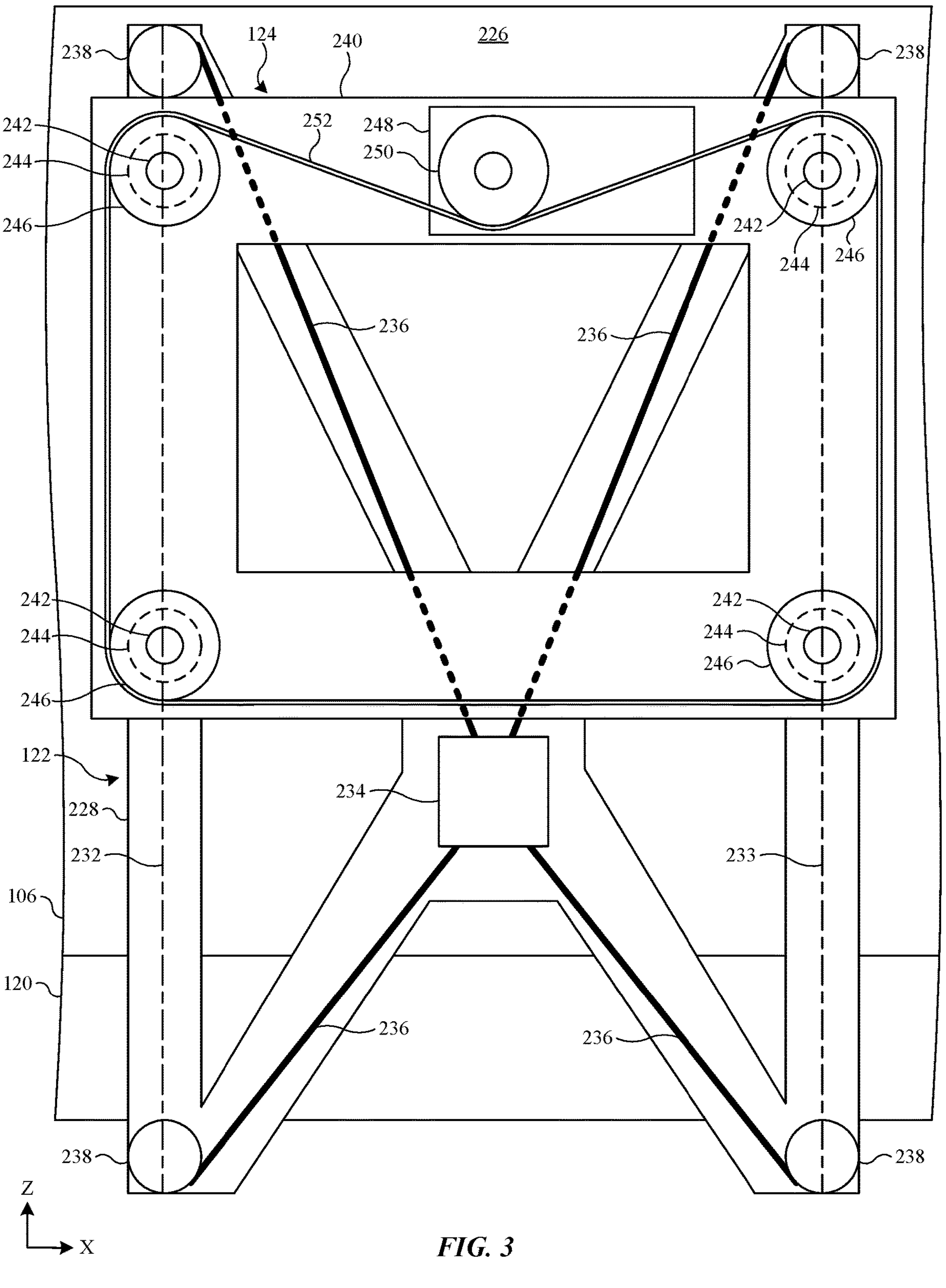
FIG. 3 is a schematic illustration that shows the window, the track assembly, and the pivot assembly, with the window in an open position.

FIGS. 2-3 are schematic illustrations that show the window 106, the window support member 120, the track assembly 122, and the pivot assembly 124. In FIG. 2, the window 106 is in the closed position. In FIG. 3, the window 106 is in the open position. The vehicle body structure 102 and the door 104 are omitted in FIGS. 2-3 for clarity.

The f member 120 is a structure that is connected to an inner surface 226 of the window 106 (e.g., by an adhesive) and is configured to be connected to the track assembly 122, such as by track fittings or other structures that are formed on or connected to the window support member 120. Connection of the window support member 120 to the track assembly 122 allows movement of the window support member 120 and the window 106 along the track assembly 122, generally in correspondence with the elevational direction Z of the vehicle 100. The window support member 120 functions to add rigidity and provide a structure by which the window 106 can be connected to the track assembly 122. The window support member 120 may have a generally u-shaped configuration, with a base part adjacent to a bottom edge of the window 106, and side parts that each extend upward from the base part, spaced from each other in the longitudinal direction X of the vehicle 100, along respective side edges of the window 106. Alternatively, the window support member 120 may have a configuration other than a generally u-shaped configuration, such as a rectangular configuration or another suitable configuration.

The track assembly 122 is located inside the door 104 in an interior space 230 of the door 104 or other vehicle body portion of the vehicle 100, and is supported by the pivot assembly 124. As an example, the pivot assembly 124 may be the sole load path or primary load path through which the track assembly 122 is supported with respect to the door 104. The track assembly 122 is supported by the pivot assembly 124 in a manner that allows the track assembly 122 to be moved with respect to the door 104, such as by pivoting of the track assembly 122 through a range of different angular orientations or positions with respect to the door 104. Because the window 106 is supported by the track assembly 122 the window 106 pivots with the door through the same range of different angular orientations or positions with respect to the door 104. As an example, the difference between minimum and maximum angular orientations for the track assembly 122 and the window 106 may be between one half of a degree and five degrees.

The track assembly 122 includes a track assembly frame 228 that serves as a primary structural component of the track assembly 122 and supports and interconnects other components of the track assembly 122. The track assembly frame 228 may be a rigid structure, formed from metal or other suitable materials. The track assembly frame 228 may be a single part structure, or may be a multi-part structure.

To support the window 106 for movement along the track assembly 122 between the closed position and the open position, the track assembly 122 includes tracks, such as a first track 232 and a second track 233 in the illustrated implementation. The first track 232 and the second track 233 are located in an interior space 230 of the door 104 or other vehicle body portion and are connected to the window support member 120 so that the window support member 120 is movable along the tracks to move the window 106 between the closed position and the open position, for example, by lowering raising the window 106 into and out of the interior space 230 of the door 104.

The first track 232 and the second track 233 extend generally in correspondence with the elevational direction Z of the vehicle 100, and are spaced from each other in the longitudinal direction X of the vehicle 100 in the illustrated implementation. In alternative implementations, different numbers of individual tracks may be included, and the tracks may be oriented differently. In the illustrated implementation, the first track 232 and the second track 233 are located inward relative to respective side edges of the window 106 in the longitudinal direction X of the vehicle 100, but the first track 232 and the second track 233 may be located differently in alternative implementations, such as by locating the first track 232 and the second track 233 adjacent to respective side edges of the window 106.

The first track 232 and the second track 233 may be integrally formed portions of the track assembly frame 228, or the first track 232 and the second track 233 may be separately formed structures that are supported by the track assembly frame 228 and are connected to the track assembly frame 228 using conventional structures or techniques, such as fasteners or welding. The first track 232 and the second track 233 define sliding connections of the track assembly 122 to the window support member 120 and the window 106, such as by disposition of portions of the window support member 120 (or included structures such as track fittings) in the first track 232 and the second track 233 in a manner that allows sliding.

The track assembly 122 includes a lift actuator 234 that is configured to cause movement of the window 106 relative to the track assembly 122. In the illustrated implementation, the lift actuator 234 is configured to cause movement of the window 106 along the first track 232 and the second track 233 of the track assembly 122, such as by lowering and raising the window support member 120 and the window 106, to allow the window 106 to move between the closed position and the open position. The lift actuator 234 is connected to the window support member 120 by cables 236 so that operation of the lift actuator 234 causes the window 106 to move by lowering and raising along the first track 232 and the second track 233.

In the illustrated implementation, the lift actuator 234 is supported by the track assembly frame 228 by connection of the lift actuator 234 to the track assembly frame 228 at a central location on the track assembly frame 228. In the illustrated implementation, the lift actuator 234 is positioned between the first track 232 and the second track 233 in the longitudinal direction X of the vehicle 100 and is positioned between top and bottom ends of the first track 232 and the second track 233 in the elevational direction Z of the vehicle 100. The cables 236 include four cables that each extend outward from the lift actuator 234 toward one of the upper or lower ends of the first track 232 and the second track 233. Cable guides 238 are located at the upper and lower ends of the first track 232 and the second track 233 to turn the cables 236 and guide them into the first track 232 and the second track 233, where the cables 236 extend along the first track 232 or the second track 233 from a respective one of the cable guides to a connection with the window support member 120 that allows the cables 236 to cause movement of the window support member 120 in response to operation of the lift actuator 234. As an example, the lift actuator 234 may be a rotary electric motor that extends and retracts the cables 236. Other configurations may be used to actuate motion of the window 106, such as different cable configurations, cables driven by multiple separate actuators, and actuator systems that do not use cables, such as actuator assemblies that use levers, cranks, scissor mechanism, screw drives, or other mechanical configurations driven by an electric motor or other actuation device. As will be explained further herein, a controller may be used to control operation of the lift actuator 234, such as by coordinating operation of the track assembly 122 and the pivot assembly 124.

The pivot assembly 124 is fixed with respect to a vehicle body portion, such as the door 104, and supports the track assembly 122. The pivot assembly 124 is configured to pivot the track assembly 122 and the window 106 with respect to the door 104. The pivot assembly 124 is located inside the door 104, in the interior space 230 of the door 104. The pivot assembly 124 includes a pivot assembly frame 240 (e.g., a pivot frame), which may be rigidly connected (e.g., fixed) to the door 104 or other vehicle body structure to rigidly connect the pivot assembly 124 to the door 104 or other vehicle body structure.

To connect the pivot assembly 124 to the track assembly 122, the pivot assembly 124 includes support rods 242, connecting structures 244, and drive members 246. The support rods 242 are supported by the pivot assembly frame 240 and are connected to the track assembly 122, by which the support rods 242 are connected to the first track 232 and the second track 233. Four of the support rods 242 are included in the illustrated implementation, but the support rods 242 may be included in other numbers. To connect the support rods 242 to the pivot assembly frame 240, the connecting structures 244 are formed on the pivot assembly frame 240 in a number equal to the number of the support rods 242, and are coupled to the support rods 242 either directly or indirectly through the drive members 246. The drive members 246 are rotatable structures such as pulleys, and one of the drive members 246 is connected to each of the connecting structures 244, for example, by a rotatable connection of each of the drive members 246 to a respective one of the connecting structures 244. The drive members 246 are configured to cause extension and retraction of the support rods 242 relative to the pivot assembly frame 240 in response to rotation of the drive members 246 in order to cause pivoting of the first track 232 and the second track 233 of the track assembly 122 with respect to the door 104 or other vehicle body portion.

The pivot assembly 124 includes a pivot actuator 248 (which may also be referred to as a drive actuator), such as a rotary electric motor, that is configured to cause rotation of the drive members 246 to actuate pivoting of the track assembly 122 and the window 106. In the illustrated implementation, the pivot actuator 248 includes an output member 250 that drives a belt 252 that is connected to the drive members 246 in a belt drive arrangement, by which the drive members 246 are rotated when the output member 250 of the pivot actuator 248 is rotated. In this implementation, the drive members 246 may be pulleys that have different sizes, so that the support rods 242 extend and retract at different rates in comparison to each other in response to operation of the pivot actuator 248. For example, an upper pair of the drive members 246 may be pulleys that are larger in diameter than pulleys used for a lower pair of the drive members 246, resulting in a faster rate of extension and retraction of a lower pair of the support rods 242 as compared to an upper pair of the support rods 242, thereby resulting in pivoting about a pivot axis that extends generally in the longitudinal direction X of the vehicle 100 and is located above the support rods 242. For example, the pivot assembly 124 may be configured such that the pivot axis of the window 106 is located at or above a top edge of the window 106. Although the foregoing description refers to extension and retraction of the support rods 242 relative to the pivot assembly 124, it should be understood that, in some implementations, the support rods 242 can be configured so that they do not extend and retract relative to the pivot assembly 124, but instead, can be configured so that the track assembly 122 moves along the support rods 242 in response to rotation of the support rods 242. Thus, the drive members 246 may be pulleys that are rotated by a drive actuator, such as the pivot actuator 248, which is operably connected to the pulleys by the belt 252. Alternatively, the pivot assembly 124 may instead use a cable and drum system to drive extension and retraction of the support rods 242. In a cable and drum system, the drive members 246 may be drums instead of pulleys, and the belt 252 is replaced by a cable.

Although pivoting the track assembly 122 and the window 106 is described herein, it should be understood that other movement patterns for the track assembly 122 and the window 106 may be implemented using the pivot assembly 124. For example, the support rods 242 may include a combination of left-hand screw threads and right-hand screw threads that cause movement of the track assembly 122 the window 106 according to a specific movement pattern as a result of their particular configuration. As an example, the support rods 242 could be configured to cause movement of an upper edge of the window 106 outboard in the lateral direction Y of the vehicle 100.

Figure 4:
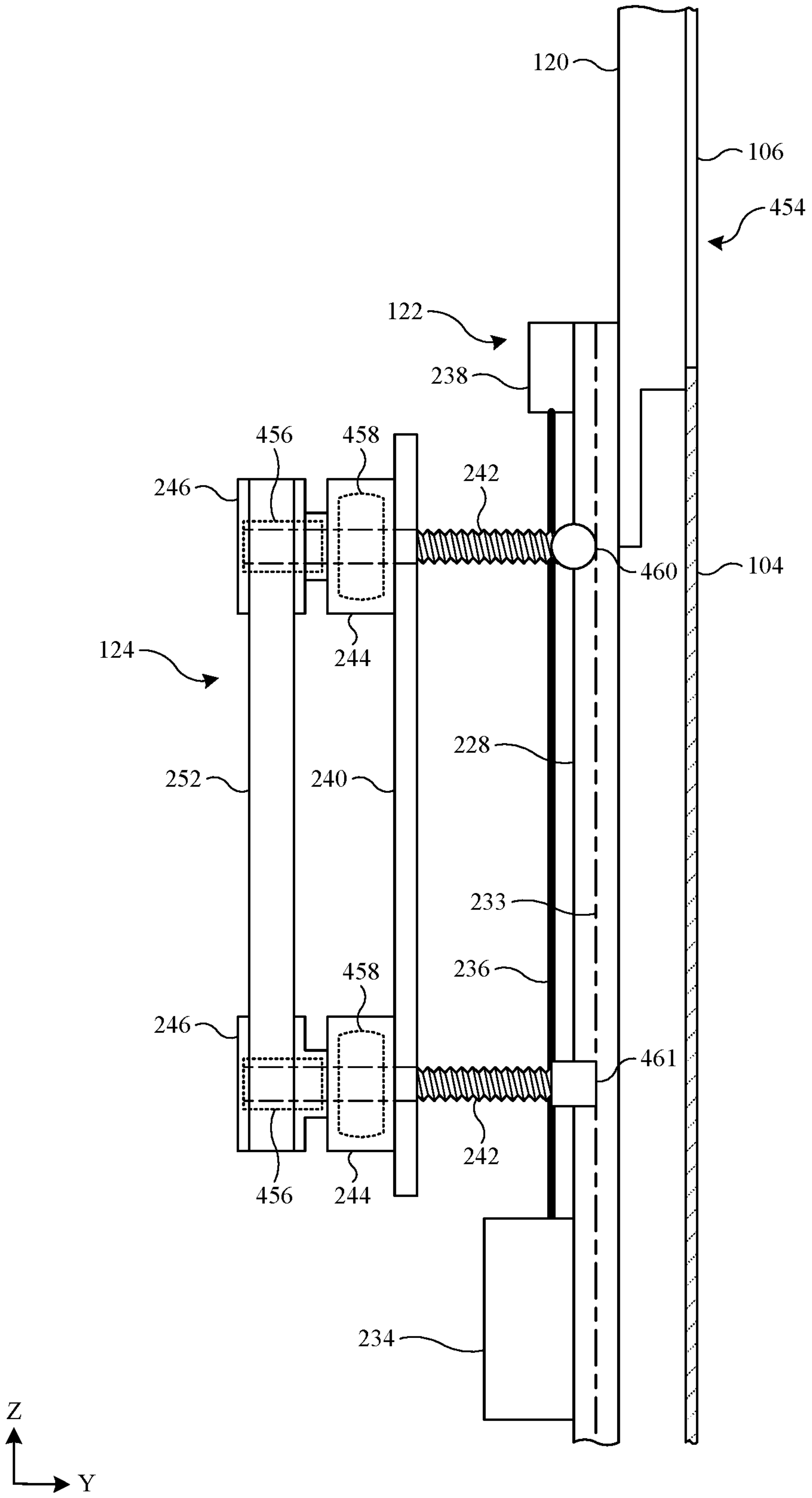
FIG. 4 is a schematic illustration that shows the window, the track assembly, and the pivot assembly, with the window in the closed position.
Figure 5:
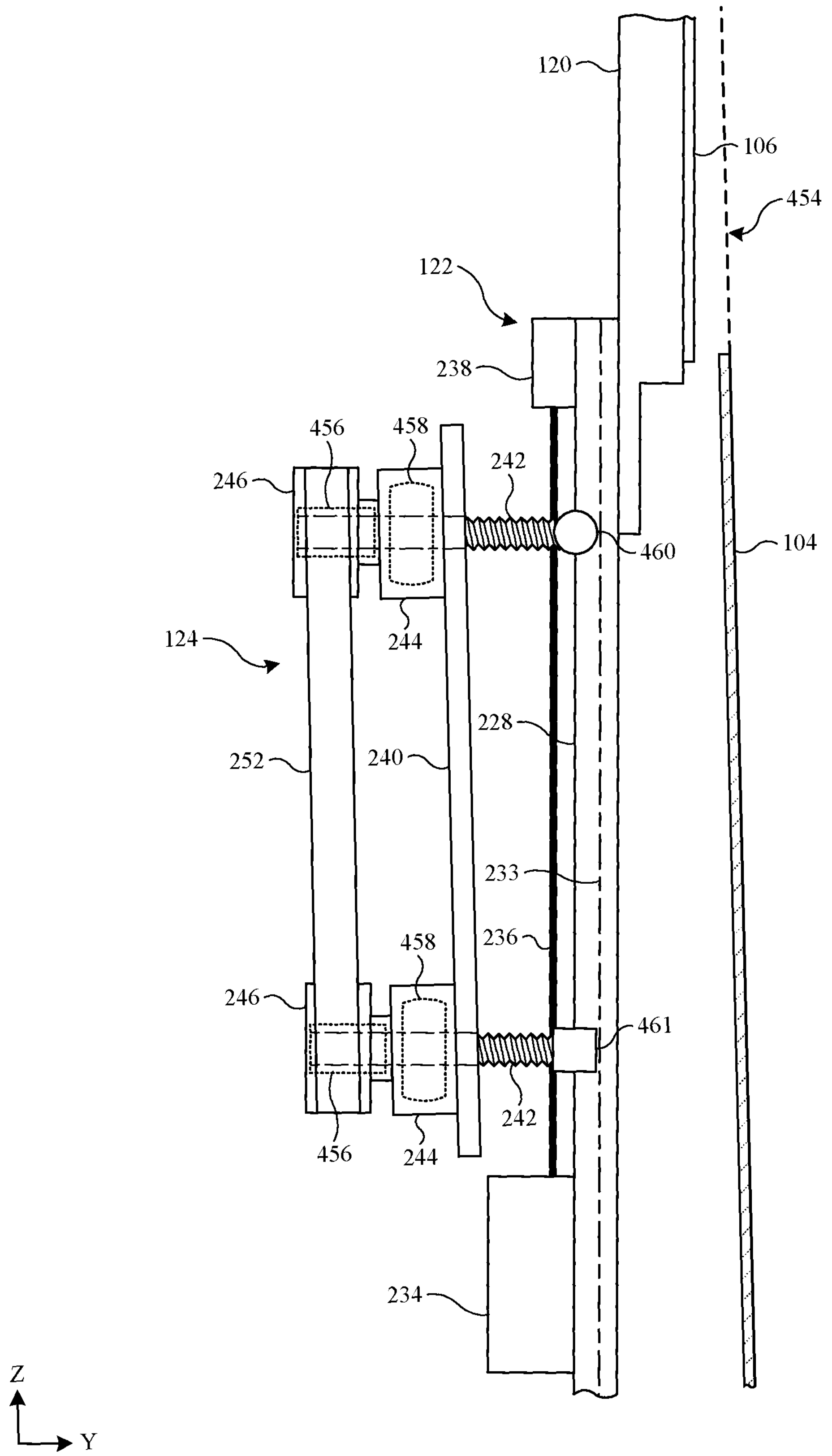
FIG. 5 is a schematic illustration that shows the window, the track assembly, and the pivot assembly, with the window pivoted away from a window opening.
Figure 6:
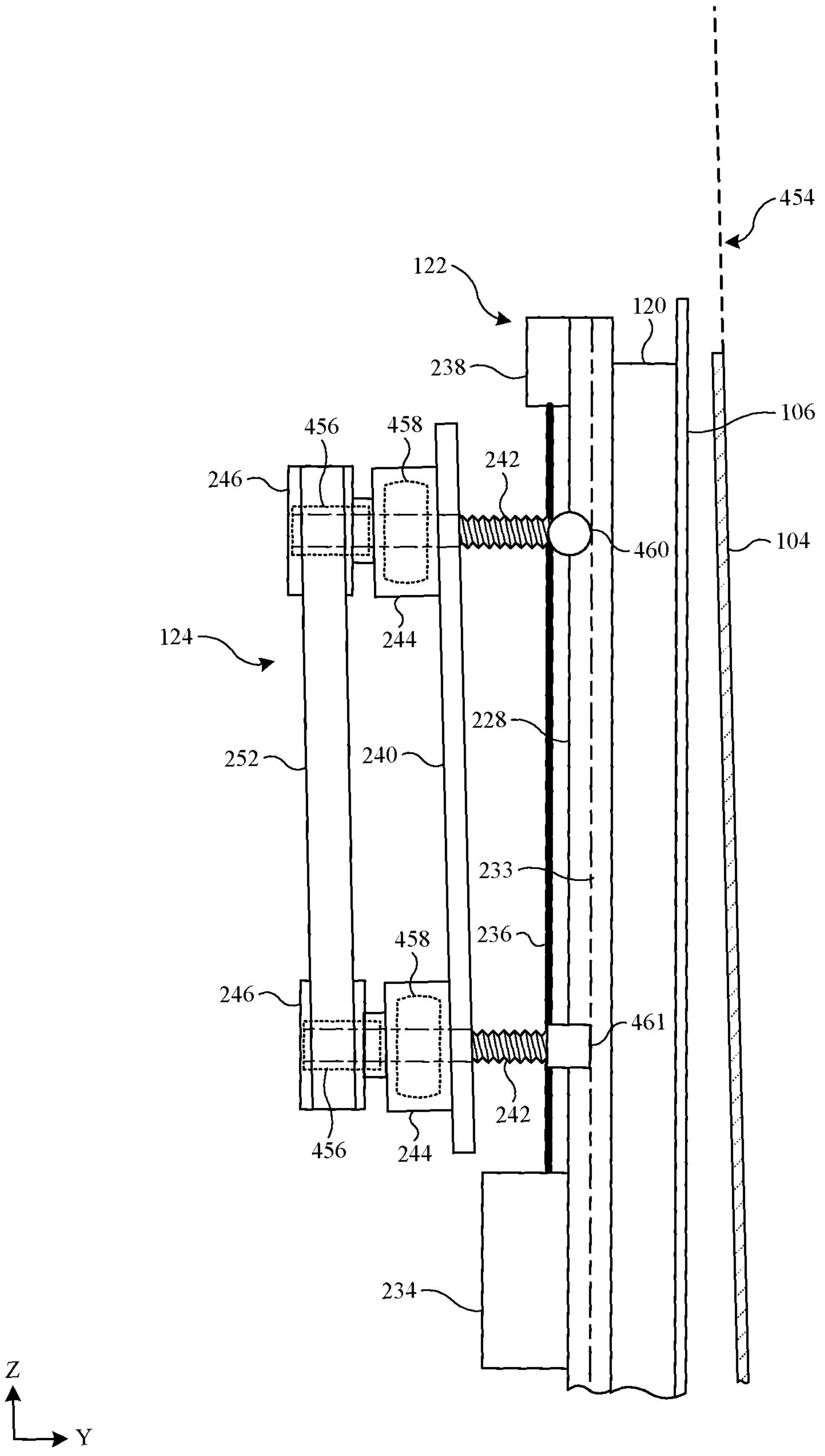
FIG. 6 is a schematic illustration that shows the window, the track assembly, and the pivot assembly, with the window in the open position.

Operation of the pivot assembly 124 will be further explained with reference to FIGS. 4-6, which are schematic cross-section illustrations of the vehicle 100 taken along line A-A of FIG. 1, showing the window 106, the track assembly 122, and the pivot assembly 124. In FIG. 4, the window 106 is in the closed position. In FIG. 5, the window is shown during movement of the window 106 from the closed position to the open position, with the window pivoted away from a window opening 454, which may be a part of the opening 116 that is defined by the vehicle body structure 102. In FIG. 6, the window 106 is in the open position. In FIGS. 4-6, the vehicle body structure 102 and portions of the door 104 are omitted for clarity.

In FIG. 4, the window 106 is in the closed position, corresponding to the window 106 being fully raised by the track assembly 122, and corresponding to the window 106 being in alignment (e.g., angular alignment) with the window opening 454, so that the window 106 is located in and occupies the window opening 454. The position shown in FIG. 4 is a first angular position of the window 106, which corresponds to angular alignment with the window opening 454. In FIGS. 5-6, the window 106 is in a second angular position, in which the window 106 has been pivoted out of alignment (e.g., angular alignment) with the window opening 454. In the second angular position, the bottom edge of the window 106 has been moved away from the window opening 454 by a first distance, and the top edge of the window 106 may have been moved away from the window opening 454 by a second distance that is less than the first distance or may not have moved away from the window opening 454, for example, if the pivot axis of the window 106 is located at the top edge of the window 106. Thus, the pivot assembly 124 may be configured to pivot the window 106 between the first angular position, in which the window 106 is in alignment with the window opening 454, and the second angular position, in which the window 106 is pivoted out of alignment with the window opening 454.

As seen in FIG. 4, the support rods 242 each extend from the track assembly 122 to the pivot assembly 124. In the illustrated implementation, the drive members 246 are configured to cause extension and retraction of support rods 242 relative to the pivot assembly frame 240 of the pivot assembly 124 in response to rotation of the drive members 246 in order to cause pivoting of the track assembly 122 and the window 106. To cause this extension and retraction, the support rods 242 and the drive members 246 may be configured using a cam/cam follower arrangement, for example, using a feature on each of the drive members 246 that is related to a feature on each of the support rods 242 so that rotation of the drive members 246 results in extension of retraction of the support rods 242 as a result of interaction of the corresponding features. In the illustrated implementation, this relationship is implemented as a screw drive, featuring a threaded connection of the support rods 242 and the drive members 246. In this implementation, the support rods 242 are threaded shafts, and the drive members 246 are threadedly connected to the threaded shafts of the drive members 246 by threaded collars 456 (e.g., nuts or other threaded structures that are integral with or separate from the drive members 246). The threaded collars 456 rotate in unison with the drive members 246, to cause extension and retraction of the support rods 242 with respect to the pivot assembly frame 240 of the pivot assembly 124.

To allow the angular orientation of the support rods 242 to change relative to the pivot assembly frame 240 during pivoting of the window 106, the connecting structures 244 may include spherical joints 458 that connect the support rods 242 to the pivot assembly frame 240. In the illustrated implementation, this is an indirect connection, in which the support rods 242 are directly connected to the drive members 246 by the threaded collars 456, and the drive members 246 are connected to the pivot assembly frame 240 by the spherical joints 458 of the connecting structures 244. To accommodate changes in angular orientation of the track assembly 122 relative to the support rods 242 during pivoting of the window 106, an upper pair of the support rods 242 may be connected to the track assembly frame 228 of the track assembly 122 by pivot joints 460, and a lower pair of the support rods 242 may be connected to the track assembly frame 228 of the track assembly 122 by fixed joints 461. Alternatively, the upper pair of the support rods 242 may be connected to the track assembly frame 228 of the track assembly 122 by the fixed joints 461, and the lower pair of the support rods 242 may be connected to the track assembly frame 228 of the track assembly 122 by the pivot joints 460. Thus, a first pair of the support rods 242 is connected to the track assembly 122 by the pivot joints 460, and a second pair of the support rods 242 is connected to the track assembly 122 by fixed joints.

Starting from the closed position (FIG. 4), the pivot assembly 124 is controlled to pivot the track assembly 122 and the window 106 inward (e.g., in the lateral direction Y of the vehicle 100) prior to movement of the window 106 from the closed position toward the open position. Stated differently movement of the window 106 from the closed position to the open position is controlled to initiate pivoting of the window 106 from the first angular position toward the second angular position using the pivot actuator 248 of the pivot assembly 124 prior to lowering the window 106 using the lift actuator 234 of the track assembly 122.

In the illustrated example, the drive members 246 are rotated by operation of the pivot actuator 248 while the support rods 242 are restrained from rotating (e.g., by the pivot joints 460 or other anti-rotation structure), which results in translation of the support rods 242 and a corresponding translation of the track assembly 122 and the window 106, which move in accordance with movement of the support rods 242 in this implementation. By rotating the lower pair of the drive members 246 at a higher rate of rotation as compared to the upper pair of the drive members 246, the track assembly 122 and the window 106 pivot with respect to the door 104 and the pivot assembly 124. The lower pair of the drive members 246 can be rotated faster than the upper pair of the drive members 246 by using a smaller diameter for the drive members 246 in a belt drive system or in a cable and drum system. Alternatively, separate actuators could be provided for the upper pair of the drive members 246 and the lower pair of the drive members 246, or each of the drive members 246 could have its own corresponding actuator.

In the illustrated implementation, the support rods 242 do not rotate, and instead translate with respect to the pivot assembly 124. In an alternative implementation, the drive members 246 of the pivot assembly could be connected to the support rods 242 in a manner that causes the support rods 242 to rotate in unison with the drive members 246. In such an implementation, the support rods 242 could be connected to the track assembly 122 in a manner that results in translation of the track assembly 122 with respect to the support rods 242 in response to rotation of the support rods 242. In implementations in which the support rods 242 are threaded shafts, the threaded collars 456 could be mounted to the track assembly 122 and connected to the support rods to cause translation of the track assembly 122 with respect to the support rods 242 in response to rotation of the support rods 242 with respect to the threaded collars.

Pivoting of the track assembly 122 and the window 106 away from the window opening 454 from the first angular position to the second angular position results in the position shown in FIG. 5. As illustrated, the track assembly 122 and the window 106 are fully pivoted to the second angular position prior to lowering the window 106 with respect to the track assembly 122. It should be understood that lowering the window 106 using the track assembly 122 may commence after the window 106 begins pivoting from the first angular position toward the second angular position, and prior to the window 106 reaching the second angular position, in which case, the window 106 may continue pivoting toward the second angular position while lowering toward the open position as a result of operation of the track assembly. In either case, by operation of the lift actuator 234 of the track assembly 122, the window 106 is lowered into the interior space 230 of the door 104 until reaching the open position, which may correspond to a fully lowered position of the window 106, as shown in FIG. 6. Returning the window 106 to the closed position occurs in the opposite manner, by first lifting the window 106 using the track assembly 122 and initiating pivoting of the window 106 back to the first angular position using the pivot assembly 124 either as the window 106 approaches a fully raised position, or after the window reaches the fully raised position.

Figure 7:
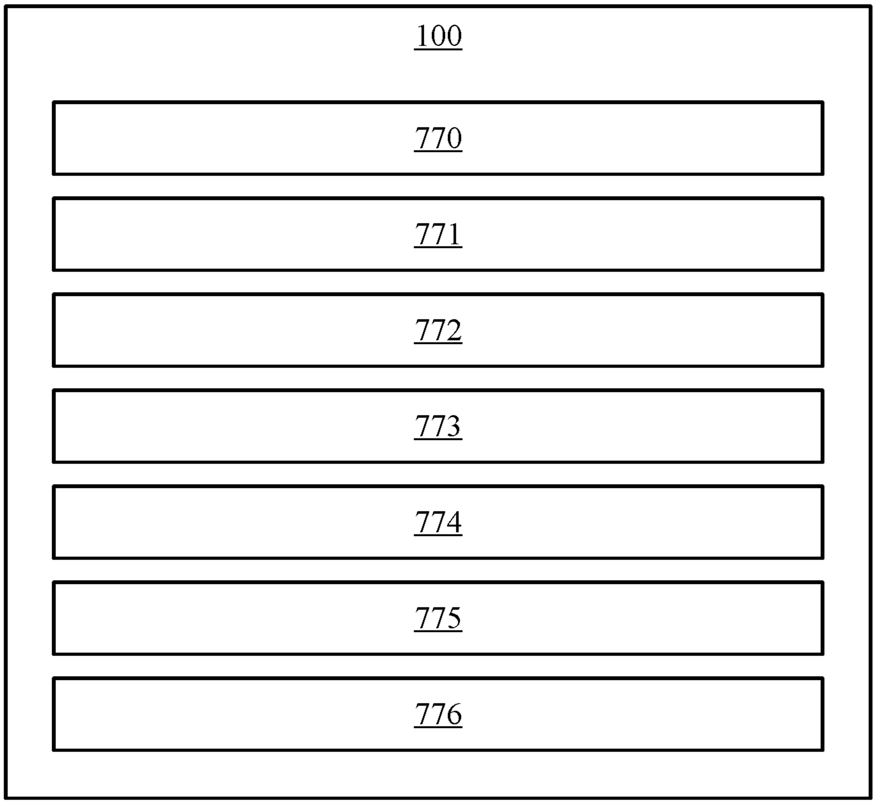
FIG. 7 is a block diagram that shows an implementation of the vehicle.

FIG. 7 is a block diagram that shows the vehicle 100. As an example, the vehicle 100 may be a conventional road-going vehicle that is supported by wheels and tires (e.g., four wheels and tires). As an example, the vehicle 100 may be a passenger vehicle that includes a passenger compartment that is configured to carry one or more passengers. In the illustrated implementation, the vehicle 100 includes a vehicle body 770, a suspension system 771, a propulsion system 772, a braking system 773, a steering system 774, a sensing system 775, and a control system 776. These are examples of vehicle systems that are included in the vehicle 100. Other systems can be included in the vehicle 100.

The vehicle body 770 includes structural components of the vehicle 100 through which other components are interconnected and supported as well as aesthetic components of the vehicle 100. The structural components of the vehicle body 770 may include, as examples, a frame, subframe, unibody, monocoque, etc. The aesthetic components of the vehicle body 770 may include exterior body panels, exterior trim panels, interior trim panels, fixtures, accessories, etc. The vehicle body 770 includes the vehicle body structure 102 and the door 104.

The suspension system 771 controls vertical motion of the wheels of the vehicle 100 relative to the vehicle body structure 102, and may include passive suspension components and/or active suspension components. The propulsion system 772 includes propulsion components that are configured to cause motion of the vehicle 100 (e.g., accelerating the vehicle 100), such as an internal combustion engine, one or more electric motors, a battery, an inverter, one or more gearboxes, etc. The braking system 773 provides deceleration torque for decelerating the vehicle 100. The steering system 774 is operable to cause the vehicle to turn by changing a steering angle of one or more wheels of the vehicle 100.

The sensing system 775 includes sensors for observing external conditions of the environment around the vehicle 100 (e.g., location of the roadway and other objects) and conditions of the vehicle 100 (e.g., acceleration and conditions of the various systems and their components). The sensing system 775 may include sensors of various types, including dedicated sensors and/or components of various systems.

The control system 776 includes communication components (i.e., for receiving sensor signals and sending control signals) and processing components (i.e., for processing the sensor signals and determining control operations), such as a controller. The control system 776 may be a single system or multiple related systems. For example, the control system 776 may be a distributed system including components that are included in other systems of the vehicle 100.

The control system 776 may include autonomous driving functions that are configured to control operation of vehicle actuator systems of the vehicle 100 without manual control inputs. As an example, the control system 776 may use inputs received from the sensing system 775 to understand the environment around the vehicle and may determine commands that are sent to one or more vehicle actuator systems, such as the propulsion system 772, the braking system 773, and the steering system 774, to cause the vehicle 100 to travel from a current location toward a destination location.

The control system 776 may exercise control over various systems and components of the vehicle 100, including controlling movement of the window 106. As an example, the control system 776 may function as a controller that is configured to control movement of the window 106 from the closed position and the open position by initiating pivoting of the window 106 from the first angular position toward the second angular position using the pivot actuator 248 prior to lowering the window using the lift actuator 234.

Figure 8:
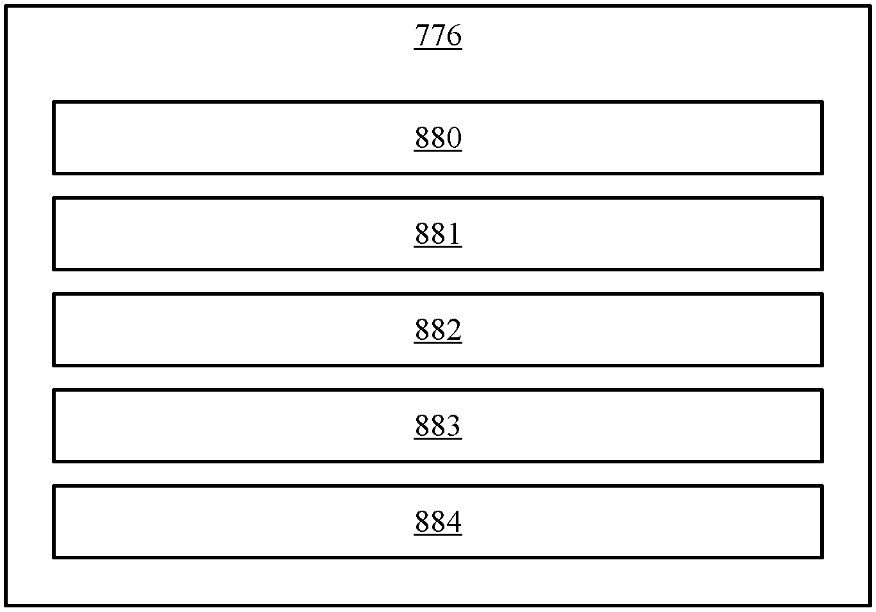
FIG. 8 is a block diagram that shows an implementation of a control system of the vehicle.

FIG. 8 is a block diagram that shows an example implementation of the control system 776 and/or other controllers or computer-implemented systems of the vehicle 100. The control system 776 may be a conventional computing device that includes include a processor 880, a memory 881, a storage device 882, one or more input devices 883, and one or more output devices 884. The control system 776 may include a bus or a similar device to interconnect the components for communication. The control system 776 may include computer program instructions (e.g., stored on the storage device 882) that are configured to cause the control system to perform the computer-implemented functions described herein with respect to the vehicle 100 and various systems thereof.

The processor 880 is operable to execute computer program instructions and perform operations described by the computer program instructions. As an example, the processor 880 may be a conventional device such as a central processing unit. The memory 881 may be a volatile, high-speed, short-term information storage device such as a random-access memory module. The storage device 882 may be a non-volatile information storage device such as a hard drive or a solid-state drive. The input devices 883 may include any type of human-machine interface such as buttons, switches, a keyboard, a mouse, a touchscreen input device, a gestural input device, or an audio input device. The output devices 884 may include any type of device operable to provide an indication to a user regarding an operating state, such as a display screen or an audio output, or any other functional output or control.

As described above, one aspect of the present technology is control of a window for a vehicle, which may, in some implementations, include the gathering and use of data available from various sources to customize operation based on user preferences and/or user behavior, such as by controlling the window to open automatically under certain circumstances according to user preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As an example, the vehicle may include sensors that are used to control operation of the window, and/or other aspects of operation of the vehicle, and these sensors may obtain information (e.g., still pictures or video images) that can be used to identify persons present in the image.

The present disclosure recognizes that the use of such personal information data, in the present technology, can be used to the benefit of users. For example, the personal information data can be used to develop a user profile that describes preferences for operation of the window.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide personal data for use in controlling the configuration and operation of the window and doors of the vehicle. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, control of the window of the vehicle can be performed without use of personal information data, such as by controlling the window according to default settings or according to user commands.

What is claimed is:

1. A vehicle closure, comprising:

a track;

a panel coupled to the track and configured for movement with respect to the track;

a pivot actuator configured to pivot the track and the panel between a first angular orientation with respect to an opening and a second angular orientation with respect to the opening;

a lift actuator configured to move the panel between a raised position with respect to the track and a lowered position with respect to the track; and a frame, wherein the track is coupled to the frame by support rods and the pivot actuator is configured to extend and retract the support rods to pivot the track and the panel between the first angular orientation and the second angular orientation.

2. The vehicle closure of claim 1, wherein the panel is in alignment with the opening in the first angular orientation, and the panel is pivoted out of alignment with the opening in the second angular orientation.

3. The vehicle closure of claim 2, wherein the pivot actuator is configured to pivot the track and the panel to the second angular orientation prior to movement of the panel from the raised position to the lowered position.

4. The vehicle closure of claim 1, wherein an outer surface of the panel is configured to be flush relative to a body surface of a vehicle body when the panel is in the raised position and in the first angular orientation.

5. The vehicle closure of claim 4, wherein the panel is configured to be located in an interior space defined by a vehicle body when the panel is in the lowered position.

6. The vehicle closure of claim 1, wherein the pivot actuator includes an electric motor.

7. The vehicle closure of claim 1, wherein the panel is at least translucent.

8. The vehicle closure of claim 1, wherein the pivot actuator is connected to drive members that are configured to extend and retract the support rods relative to the frame in response to rotation of the drive members in order to cause the pivoting of the track and the panel.

9. The vehicle closure of claim 8, wherein the support rods are threaded shafts, and the drive members are threadedly connected to the threaded shafts.

10. A vehicle closure, comprising:

tracks that are configured to be located in an interior space defined by a vehicle body;

a panel;

a panel support that is coupled to the panel and is coupled to the track in a manner that allows sliding of the panel support with respect to the track;

a pivot frame that is configured to be fixed to the vehicle body;

support rods that are coupled to the pivot frame and are coupled to the tracks; and drive members that are configured to extend and retract the support rods relative to the pivot frame to pivot the track and the panel between a first angular orientation with respect to an opening defined by the vehicle body and a second angular orientation with respect to the opening.

11. The vehicle closure of claim 10, wherein the drive members include pulleys that are configured to be rotated by a pivot actuator.

12. The vehicle closure of claim 11, wherein the support rods include threaded shafts, and the pulleys are threadedly connected to the threaded shafts.

13. The vehicle closure of claim 10, further comprising:

a lift actuator configured to move the panel and the panel support between a lowered position and a raised position with respect to the tracks.

14. The vehicle closure of claim 10, wherein the support rods are connected to the frame by spherical joints, a first pair of the support rods is connected to the tracks by pivot joints, and a second pair of the support rods is connected to the tracks by fixed joints.

15. The vehicle closure of claim 10, wherein the panel is configured to be located in the interior space of the vehicle body when the panel is in the open position and an outer surface of the panel is configured to be flush relative to a body surface of the vehicle body when the panel is in the closed position.

16. A vehicle closure, comprising:

a panel that is movable between a raised position, in which the panel is configured to obstruct an opening defined by a vehicle body, and a lowered position, in which the panel is located in an interior space defined by the vehicle body;

tracks that support the panel;

a lift actuator that is configured to move the panel relative to the tracks between the raised position and the lowered position;

a frame that is configured to be fixed to the vehicle body;

support rods that are coupled to the pivot frame and are coupled to the tracks, wherein the support rods are connected to the frame by spherical joints, a first pair of the support rods is connected to the tracks by pivot joints, and a second pair of the support rods is connected to the tracks by fixed joints; and a pivot actuator that is configured to pivot the panel and the tracks between a first angular orientation with respect to the opening and a second angular orientation with respect to the opening by extension and retraction of the support rods.

17. The vehicle closure of claim 16, wherein:

an outer surface of the panel is configured to be flush relative to a body surface of the vehicle body when the panel is in the raised position and in the first angular orientation.

18. The vehicle closure of claim 16, wherein the pivot actuator includes an electric motor.

19. The vehicle closure of claim 16, wherein the panel is at least translucent.

20. The vehicle closure of claim 16, wherein the pivot actuator is configured to extend and retract the support rods by rotation of drive members, the support rods are threaded shafts, and the drive members are threadedly connected to the threaded shafts.

* * * * *